United States Patent
Ghouti et al.

(10) Patent No.: US 9,519,966 B2
(45) Date of Patent: Dec. 13, 2016

(54) METHOD, SYSTEM AND COMPUTER PROGRAM PRODUCT FOR BREAST DENSITY CLASSIFICATION USING PARTS-BASED LOCAL FEATURES

(71) Applicant: King Fahd University of Petroleum and Minerals, Dhahran (SA)

(72) Inventors: Lahouari Ghouti, Dhahran (SA); Abdullah Hussein Owaidh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/797,977

(22) Filed: Jul. 13, 2015

(65) Prior Publication Data
US 2016/0314579 A1    Oct. 27, 2016

Related U.S. Application Data

(60) Provisional application No. 62/150,990, filed on Apr. 22, 2015.

(51) Int. Cl.
*G06K 9/00* (2006.01)
*G06T 7/00* (2006.01)
(Continued)

(52) U.S. Cl.
CPC .............. *G06T 7/0012* (2013.01); *G06K 9/52* (2013.01); *G06K 9/6267* (2013.01);
(Continued)

(58) Field of Classification Search
CPC .................... G06T 2207/20172; G06T 7/0012
See application file for complete search history.

(56) References Cited

U.S. PATENT DOCUMENTS 9,147,245 B1 * 9/2015 Ghouti .................. G06T 7/0012
2009/0245611 A1 * 10/2009 Can ...................... G06K 9/0014
382/133

(Continued)

OTHER PUBLICATIONS

Li et al (NPL "Non-negative matrix factorization toolbox for biological data mining", 2013, BioMed Central).*

(Continued)

*Primary Examiner* — Oneal R Mistry
(74) *Attorney, Agent, or Firm* — Oblon, McClelland, Maier & Neustadt, L.L.P.

(57) ABSTRACT

An automated content-based image retrieval method, a system and a computer program product for the classification of breast density from mammographic imagery. Raw digital mammogram images taken of patients are initially preprocessed to remove noise and enhance contrast, then subjected to pectoral muscle segmentation to produce region of interest (ROI) images. The ROI images are then decomposed using non-negative matrix factorization (NMF), where a non-negative sparsity constraint and reconstruction quality measures are imposed on the extracted and retained first few NMF factors. Based on the retained NMF factors, kernel matrix-based support vector machines classify the mammogram images binomially or multinomially to breast density categories. Methods of assessing and comparing the NMF-based breast classification method to principal component analysis or PCA-based methods are also described, and the NMF-based method is found to achieve higher classification accuracy and better handling of invariance in the digital mammogram images because of its parts-based factorization.

14 Claims, 7 Drawing Sheets

(51) Int. Cl.
*G06K 9/62* (2006.01)
*G06K 9/52* (2006.01)

(52) U.S. Cl.
CPC ............... *G06T 2207/10116* (2013.01); *G06T 2207/20172* (2013.01); *G06T 2207/30068* (2013.01)

(56) References Cited

U.S. PATENT DOCUMENTS

| | | | | |
|---|---|---|---|---|
| 2011/0026803 | A1* | 2/2011 | Can | G06T 5/004 382/133 |
| 2012/0116232 | A1* | 5/2012 | Caspers | A61B 5/0075 600/476 |
| 2014/0343420 | A1* | 11/2014 | Zhang | A61B 8/0825 600/437 |
| 2015/0371379 | A1* | 12/2015 | Averikou | A61B 8/06 382/128 |

OTHER PUBLICATIONS

Maiprasert et al (NPL: "Comparison Multinomial Logistic Regression and Discriminant Analysis in predicting the stage of Breast Cancer" IJCSNS International Journal of Computer Science and Network Security, vol. 12 No. 4, Apr. 2012, p. 25, ).*

Mendes et al (NPL Classification Into Normal and Abnormal Breast Tissue using NMF and SVM, IEEE, Apr. 2012 ISBN 978-3-200-02588-2).*

Wang et al (NPL "Non-negative matrix factorization by maximizing correntropy for cancer clustering" BMC Bioinformatics 2013, 14:107).*

\* cited by examiner

PRIOR ART

METHOD, SYSTEM AND COMPUTER PROGRAM PRODUCT FOR BREAST DENSITY CLASSIFICATION USING PARTS-BASED LOCAL FEATURES

CROSS-REFERENCE TO RELATED APPLICATIONS

The present application claims priority to U.S. Provisional application Ser. No. 62/150,990, filed Apr. 22, 2015, the entire contents of which are incorporated herein by reference.

TECHNICAL FIELD

The present invention relates to a method, a system and a computer program product for the classification of breast density from mammographic imagery. Specifically, the invention relates to an automated content-based image retrieval (CBIR) method, system and computer program product for the classification of breast density in mammogram images.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In a study covering data population from 1975-1988, the US National Cancer Institute (NCI) estimates that the overall lifetime risk for developing invasive breast cancer is approximately one in eight (approximately 12.6 percent) among American women (U.S. Cancer Statistics Working Group. United States Cancer Statistics: 1999-2008 Incidence and Mortality Web-based Report. Atlanta: U.S. Department of Health and Human Services, Centers for Disease Control and Prevention and National Cancer Institute; 2012. Available at: www.cdc.gov/uscs—incorporated herein by reference in its entirety). Aiming to increase the survival time for women with breast cancer, mass-screening mammography programs are developed and adopted as an effective method. The integration of Computer-Aided Detection (CAD) tools with these screening programs is an interesting avenue worth exploring. Recent advances in CAD techniques and systems have focused on the detection of calcifications and the detection of mammographic masses. Although various degrees of success have been achieved in the above-mentioned detection problems, the accurate identification of breast cancer from digital mammogram images still remain a challenging and daunting task. Based on mammogram images, the mammographic appearance of the breast widely varies which constitutes a real challenge for the radiologist exploring and/or interpreting a benign mammogram.

There exist various types of radiographically-visible density including: 1) Ducts; 2) Lobular elements; and 3) Fibrous connective tissue. The fibrous connective tissue is further classified into: 1) Intralobular tissue; and 2) Extralobular tissue. The high variability in breast density reported from mammograms is mainly due to the extralobular tissue.

The interpretation of a mammogram images depends heavily on the breast density. In fact, the breast density affects the early detection of malignancy and large cancers especially in case of considerable density. In such cases, the mammogram background is not uniform and, therefore, it is very difficult to locate ill-defined cancers. The American College of Radiology (ACR) Breast Imaging Reporting and Data System (BIRADS) adopts a standard breast density classification system. In this system, the breast density is classified into four (04) major categories according to the recommendations of the American College of Radiology (ACR) Breast Imaging Reporting and Data System (BI-RADS) (U.S. Cancer Statistics Working Group. United States Cancer Statistics: 1999-2008 Incidence and Mortality Web-based Report. Atlanta: U.S. Department of Health and Human Services, Centers for Disease Control and Prevention and National Cancer Institute; 2012. Available at: www.cdc.gov/uscs—incorporated herein by reference in its entirety): 1) Extremely dense; 2) Heterogeneously dense; 3) Fat with some fibroglandular tissue; and 4) Predominantly fat.

FIGS. 1A-1D illustrate examples of the aforementioned breast densities.

It has been a widely accepted fact that dense tissue indicates a much higher risk of developing breast cancer than a fatty tissue (D. Kopans, Breast imaging, 3rd Edition, Lippincott-Raven, Philadelphia, 2006—incorporated herein by reference in its entirety). On the other hand, the presence of breast cancer is often masked in a mammogram having a dense tissue which increases the likelihood of missing the presence of breast cancer. Therefore, the challenge is doubled for women by being at higher risk of the disease and higher risk of cancer misdiagnosis by the mammographic approach. However, a recent study published in the Journal of the National Cancer Institute (U.S. Cancer Statistics Working Group. United States Cancer Statistics: 1999-2008 Incidence and Mortality Web-based Report. Atlanta: U.S. Department of Health and Human Services, Centers for Disease Control and Prevention and National Cancer Institute; 2012—incorporated herein by reference in its entirety. Available at: www.cdc.gov/uscs) revealed that, among women with breast cancer, those with fat breasts do not have a lower risk of dying of the disease than those with denser breasts. In this study, 9000 breast cancer patients were followed for an average period of 6½ years. During that time, 889 of these women died of breast cancer. There was no difference in the death rate of women with the densest breasts on mammography versus those with less dense (fattier) breasts. In some U.S. states, mammography facilities are required by state law to notify their patients if they have dense breasts. In such situations, patients are advised to inquire about whether they should undergo additional screening with ultrasound or MRI. This additional screening may detect breast cancer cases missed by the mammography procedure. However, it should be noted that additional screening will also greatly increase the likelihood of false alarms leading to unnecessary biopsies and the overall cost of screening approach.

Automated classification of breast density can be classified into: 1) Matrix factorization; 2) Global histogram; and 3) Texture analysis methods. Matrix factorization techniques factorize the mammogram images into a product of several factor images according to specific constraints. Consequently, the mammographic images, known for their high dimensionality, undergo a drastic dimensionality reduction where only dominant features are kept. Oliver et al. (A. Oliver, X. Lado, E. Perez, J. Pont, J. Denton, E. Freixenet, and J. Marti., "Statistical approach for breast density segmentation. Journal of Digital Imaging," vol. 23, no. 5, pp. 55-65, 2009—incorporated herein by reference in its entirety) proposed a two-class breast density classification. Image segmentation is used as a pre-processing step. Then, features are extracted using principal component analysis (PCA) and linear discriminant analysis (LDA) techniques to classify the mammogram images into fatty and dense types. LDA is also sometimes known as Fisher Linear Discriminant (FLD). Features extracted using 2D-PCA are proposed by DeOlivera et al. (J. E. E. de Oliveira and A. de Araujo. Mammosyslesion: A content-based image retrieval system for mammographies," in 17th International Conference on Systems, Signals and Image Processing (IWSSIP 2010), pp. 408-411, 2010—incorporated herein by reference in its entirety) to build a two-class (fatty and dense) content-based image retrieval (CBIR) system. A support vector machine (SVM) with Gaussian kernels classifies image features represented by the first four principal components (PC). Reported results indicate that 2D-PCA outperforms the standard PCA in terms of classification accuracy. Using the same features, proposed in DeOlivera et al. (J. E. E. de Oliveira and A. de Araujo. Mammosyslesion: A content-based image retrieval system for mammographies," in 17th International Conference on Systems, Signals and Image Processing (IWSSIP 2010), pp. 408-411, 2010—incorporated herein by reference in its entirety), Thomas et al. (T. M. Deserno, M. Soiron, J. E. E. de Oliveira, and A. de Araujo, "Towards computer-aided diagnostics of screening mammography using content-based image retrieval," in 24th Conference on Graphics, Patterns and Images (Sibgrapi 2011), pages 1754-1760, 201—incorporated herein by reference in its entirety) consider 4 density classes according to the BI-RADS lexicon using a similar classifier. DeOliveira et al. (J. E. E. de Oliveira, G. Camara-Chavez, A. de Araujo, and T. M. Deserno, "MammoSVD: A content-based image retrieval system using a reference database of mammographies," in 22nd IEEE International Symposium on Computer-Based Medical Systems, pp. 1-4, 2009—incorporated herein by reference in its entirety) propose a CBIR system, called MammoSVD, where image features are extracted using the singular value decomposition (SVD) algorithm. It is noteworthy that MammoSVD system is a binary classifier (fatty and dense tissue) based on an SVM learning machine. The SVD-based features provide a good characterization of the mammographic texture. MammoSVD system achieves 90% classification accuracy. In DeOliveira et al. (J. E. E. de Oliveira, G. Camara-Chavez, A. de Araujo, and T. M. Deserno, "Content-based image retrieval applied to BI-RADS tissue classification in screening," World Journal of Radiology, vol. 3, no. 1, pp. 24-31, 2011—incorporated herein by reference in its entirety), a 4-class model, called MammoSVx is proposed with features are represented using the largest 25 singular values of the SVD decomposition of the mammogram images. Using an SVM learning model with polynomial kernel against a mammographic database containing 10000 images, a classification accuracy of 82.14% is achieved by MammoSVx.

The present disclosure aims to provide a method, a system and a computer program product for the classification of breast mammographic images according to the BI-RADS radiological lexicon, where a breast type is identified on the basis of the underlying texture of the breast which is highly correlated with the breast density. Then, based on this classification, the method, system or computer program product generates a new mammogram image which is automatically categorized into one of the density classes or categories. This automation mitigates subjectivity introduced by the manual process carried out by radiologists. Moreover, further image handling and process is applied based on this classification. From an image processing viewpoint, processing algorithms are used according to the breast density of the underlying mammogram images. In the same time, "hard" cases can be singled out for further processing or double screening as per the BI-RADS recommendations. (G. L. Gierach, L. Ichikawa, K. Kerlikowske, L. A. Brinton, G. N. Farhat, P. M. Vacek, D. L. Weaver, C. Schairer, S. H. Taplin S H and M. E. Sherman, "Relationship between mammographic density and breast cancer death in the breast cancer surveillance consortium," Journal of Natl. Cancer Inst., Vol. 104, No. 16, pp 1218-1227, August 2012—incorporated herein by reference in its entirety).

BRIEF SUMMARY OF THE INVENTION

According to a first aspect, there is provided a computer-implemented method for classifying breast density from mammographic imagery. The method comprises (a) pre-processing one or more digital mammogram images of a patient with a processing circuitry to remove noise and enhance contrast; (b) segmenting pectoral muscle from the one or more pre-processed digital mammogram images to produce one or more extracted region of interest images and saving the one or more extracted region of interest images in a computer memory; (c) grouping the one or more extracted region of interest images to produce one large mammogram image; (d) decomposing the large mammogram image with the processing circuitry by non-negative matrix factorization to extract and retain a plurality of non-negative matrix factors; and (e) classifying the plurality of non-negative matrix factors with a kernel matrix-based support vector machine according to breast density to two or more breast density categories.

In certain embodiments, the method further comprises (f) imposing a non-negative sparsity constraint and reconstruction quality measures on the plurality of non-negative matrix factors to enhance overall accuracy of breast density classification.

In certain embodiments, the large mammogram image is represented by an m-by-n mammogram image A and hence, the non-negative matrix factorization is according to one of the following equations:

$$A_{m\times n} \approx W_{m\times r} P_{r\times x} \qquad \text{(Eq. 2); or}$$

$$A_{m\times n} = W_{m\times r} P_{r\times n} + E_{m\times n} \qquad \text{(Eq. 3);}$$

where columns of W are NMF base images, rows of P are encoding coefficients of the NMF base images, E is factorization error, r is rank and such that $(m+n)r < m \times n$.

In one embodiment, the decomposing retains 5 to 10 non-negative matrix factors.

In another embodiment, the decomposing retains 11 to 20 non-negative matrix factors.

In one or more embodiments, the classifying is binomial or multinomial.

In one embodiment, the classifying is in accordance with the BI-RADS mammography classification system.

In at least one embodiment, the method for classifying breast density from mammographic imagery has a mean accuracy of at least 77.

According to a second aspect, the present disclosure provides a non-transitory computer-readable storage medium having computer-readable instructions thereon which, when executed by a computer, causes the computer to perform a computer-implemented method for classifying breast density from mammographic imagery, the method being in accordance with the first aspect of the present disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1D:
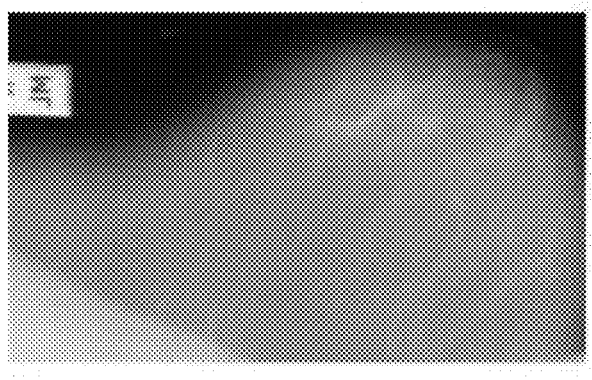
FIG. 1D is a mammogram image illustrating the predominantly fat breast density class.
Figure 1C:
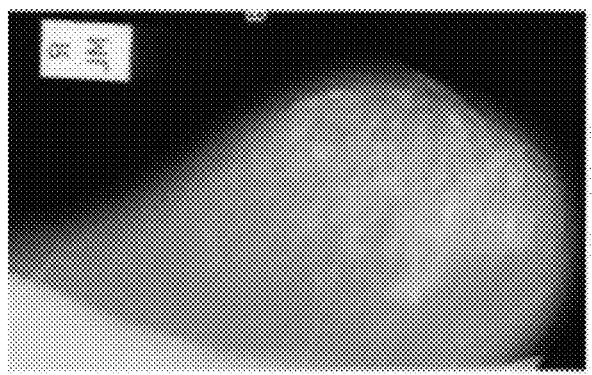
FIG. 1C is a mammogram image illustrating the fat with some fibroglandular breast density class.
Figure 1B:
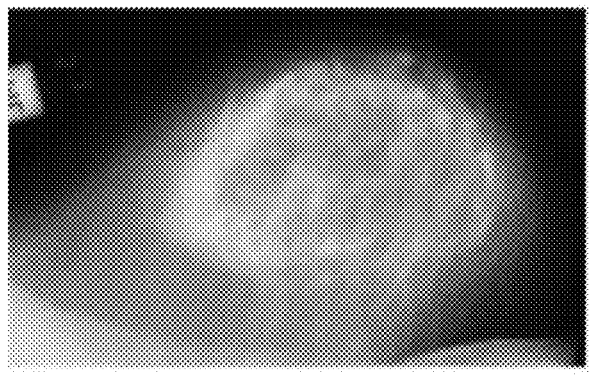
FIG. 1B is a mammogram image illustrating the heterogeneously dense breast density class.
Figure 1A:
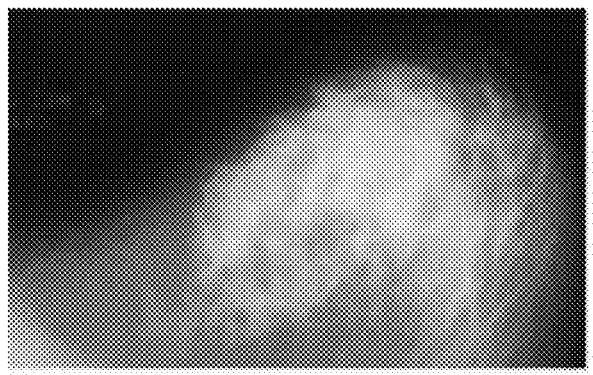
FIG. 1A is a mammogram image illustrating the extremely dense breast density class.

Referring now to the drawings, wherein like reference numerals designate identical or corresponding parts throughout the several views.

The present disclosure relates an automated content-based image retrieval (CBIR) method, a system and a computer program product for the classification of digital breast mammographic images based on breast tissue density. The breast density classification may be binomial or multinomial. In some embodiments, the breast density classification is in accordance with the BI-RADS radiological lexicon, where a breast type is identified on the basis of the underlying texture of the breast which is highly correlated with the breast density. In the method and the system, novel features extracted from non-negative matrix factorization (NMF) and classified using machine learning classifiers are applied to improve the classification of breast density in the digital mammograms.

In medical content-based information retrieval (CBIR) systems, the access to information is performed by the visual attributes extracted from images. The definition of a set of features, capable to describe effectively each region contained in an image, is one of the most complex tasks in the analysis of images. In addition, the process of characterization affects all the subsequent process of a CBIR system (U.S. Cancer Statistics Working Group. United States Cancer Statistics: 1999-2008 Incidence and Mortality Web-based Report. Atlanta: U.S. Department of Health and Human Services, Centers for Disease Control and Prevention and National Cancer Institute; 2012. Available at: www.cdc.gov/uscs—incorporated herein by reference in its entirety). An image can be numerically represented by a feature vector, which should reduce the dimensionality of the image and emphasize aspects of this image (D. Kopans, Breast imaging, 3rd Edition, Lippincott-Raven, Philadelphia, 2006—incorporated herein by reference in its entirety).

The CBIR system as disclosed herein is based on breast density classification using features extracted from non-negative matrix factorization (NMF) where only the first NMF factors are retained.

Among the known approaches for the automated classification of breast density such as but not limited to matrix factorization, global histogram and texture analysis methods, matrix factorization techniques factorize the mammogram images into a product of several factor images according to specific sparsity constraints. Consequently, the mammographic images, due to their high dimensionality, undergo a drastic dimensionality reduction where only dominant features are kept.

Figure 2A:
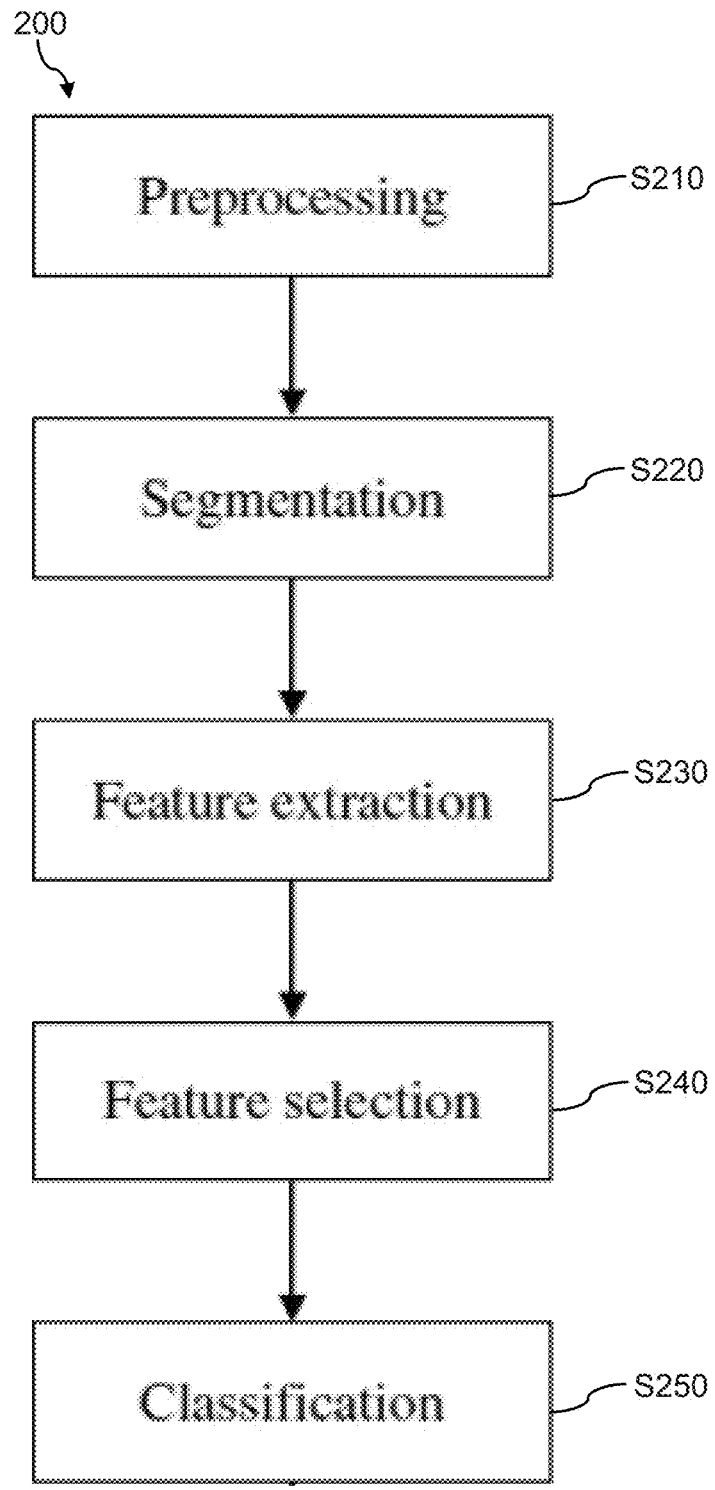
FIG. 2A is a flowchart illustrating the steps in the CBIR NMF-based method for classifying breast density according to one embodiment.
Figure 2B:
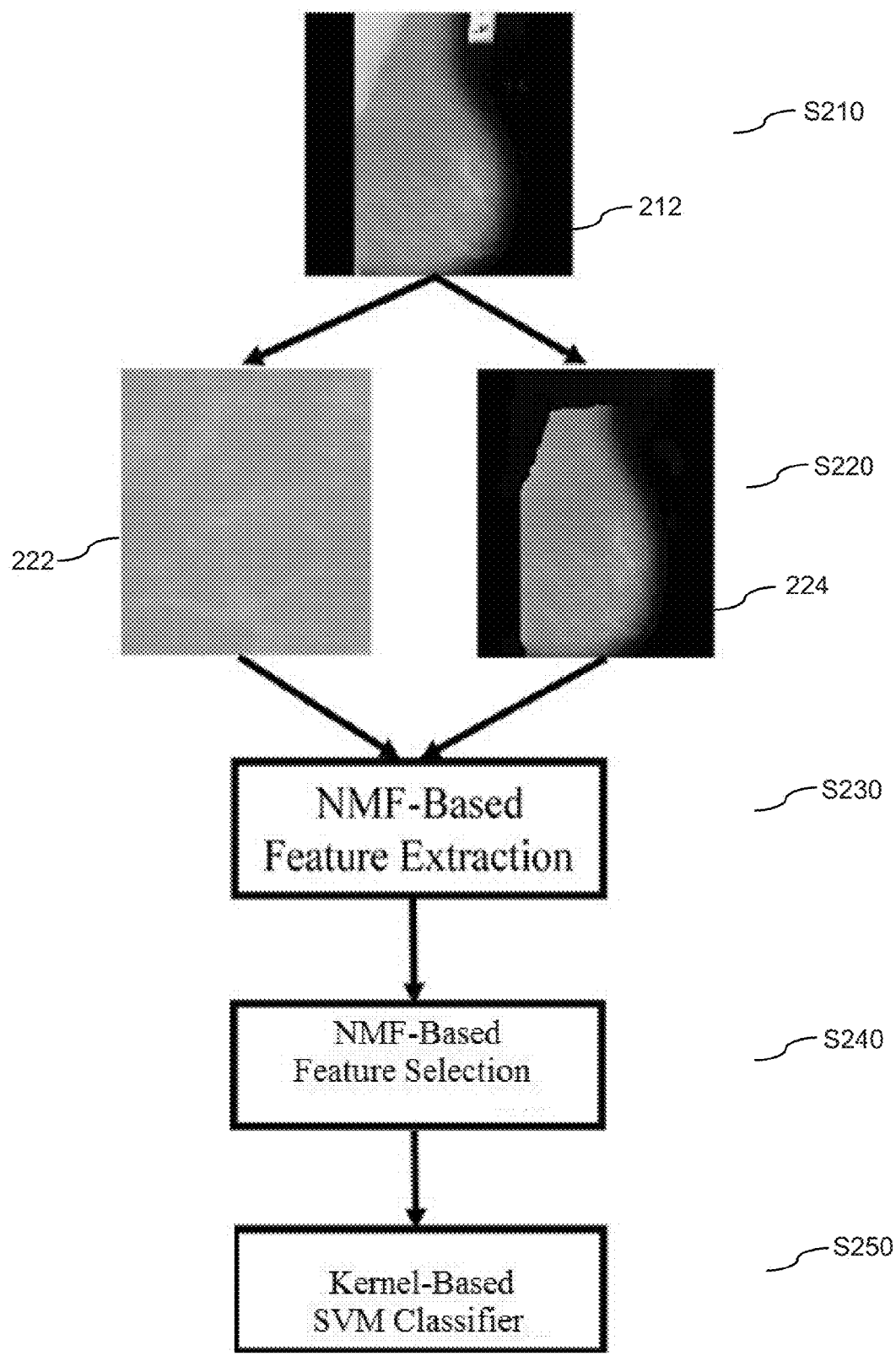
FIG. 2B is a flowchart illustrating the steps in the CBIR NMF-based method for classifying breast density of FIG. 2A, where a raw, pre-processed mammographic sample image 212 and its extracted region of interest 222 and post-segmented sample 224 are shown.

Referring to FIGS. 2A and 2B, the NMF-based breast density classification method 200 includes three main building blocks: 1. Pre-processing and segmentation (steps S210, 220); 2. NMF extraction and selection (steps S230, 240); 3. Machine learning-based classification.

The pre-processing step S210 is used for successful and error-free mammographic interpretation. This step includes noise removal and contrast enhancement a sample digital mammogram 212 as ground truth mammographic data. At steps S210 and S220, a plurality of digital mammogram samples may constitute the ground truth data that may all be pre-processed and segmented at the same time.

In some embodiments, the pre-processing step S210 may be preceded by a step of obtaining one or more digital mammogram images. To take a digital mammogram image, a patient's breast is briefly compressed or squeezed between two plates attached to a mammogram machine, which are typically comprised of one adjustable plastic plate on top and one fixed X-ray plate on the bottom. The bottom plate holds a digital X-ray receptor/detector and/or a computer that records the image. X-rays (low-energy, usually 20-50 kVp) generated during digital mammography are converted to electric signals that can then be stored in a computer memory. At the end of a mammography procedure, a black and white image is typically produced. This image constitutes the ground truth mammographic data.

After the pre-processing, the segmentation step S220 aims to separate the breast from other objects in the mammogram image 212 with a minimum loss of breast tissue (C. Mata, J. Freixenet, X., Llado and A. Oliver, "Texture descriptors applied to digital mammography,"—incorporated herein by reference in its entirety). In screening mammography, both head-to-foot (craniocaudal, CC) view and angled side-view (mediolateral oblique, MLO) images of the breast are taken. During segmentation at step S220, the pectoral muscle, visible in MLO views, is separated apart, enabling the extraction of the image region of interest 222 (ROI). In one embodiment, the extracted ROIs contain 300×300 pixels. A raw, pre-processed mammographic sample image and its post-segmented sample 224 are shown in FIG. 2B. As shown in FIG. 2B, pre-processing and segmentation have significantly improved the visual quality of the image prior to inspection by radiologists.

At step S230, mammogram images, having the same density annotation, are grouped into a large mammogram image, A, which is decomposed, in order to reduce data dimension, using the following non-negative matrix factorization:

$$A \approx W \times V \quad (Eq. 1)$$

where the rows of $W \in \mathbb{R}^{m \times r} \neq$ and the columns of $V \in \mathbb{R}^{r \times n} \neq$ represent the NMF basis and their encoding coefficients, respectively. Image approximation is achieved using ranks satisfying: $(m+n)r < m \times n$.

Figure 3:
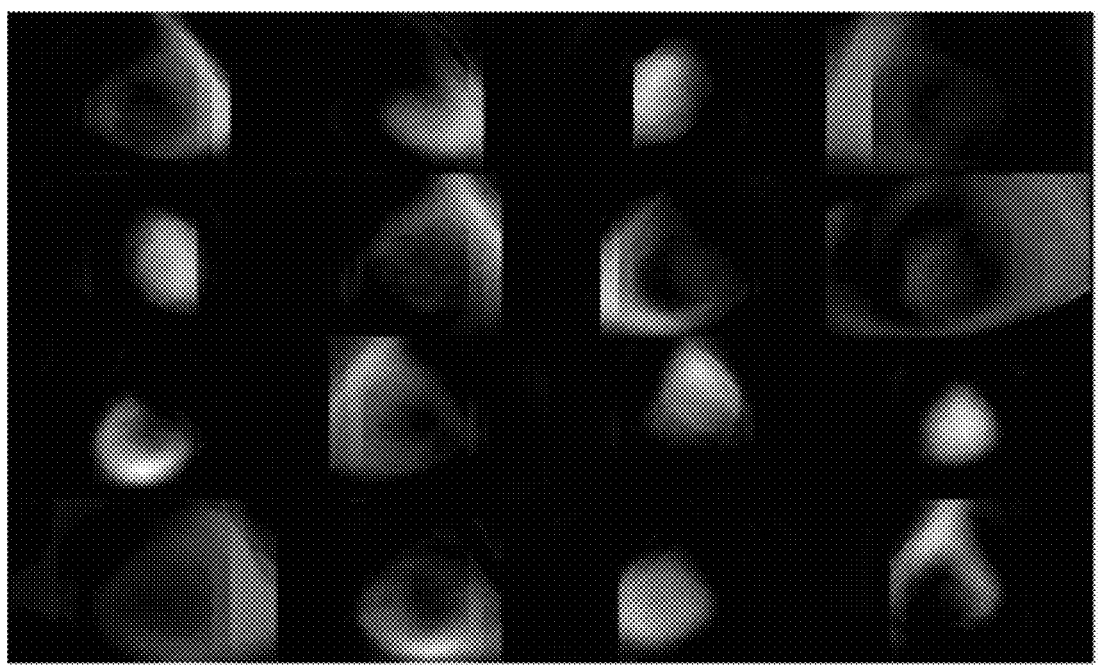
FIG. 3 is an image showing the first 16 retained bases of the non-negative matrix factorization (NMF) decomposition.

Discriminant features are then extracted by selecting and retaining only the first few factors at step S240. In some embodiments, only the first 11-20 NMF factors (or bases) are retained, for example, 16 NMF factors and the NMF factorization efficiency is illustrated in FIG. 3. In other embodiments, 5 to 10 NMF factors are retained.

In some embodiments, a non-negative sparsity constraint and reconstruction quality measures are imposed on the extracted and retained first few NMF factors to improve the overall classification accuracy of breast densities.

Mammogram images are made up of non-negative components commonly known as image pixels. When factoring a mammogram image, the extracted image features should be as realistic as possible. Imposing a non-negativity sparsity constraint and reconstruction quality measures on the image factorization process would ensure the existence of such features (D. D. Lee and H. S. Seung. Learning the parts of objects by non-negative matrix factorization. Nature, 401(6755):788-791, 1999—incorporated herein by reference in its entirety). NMF, which is the factorization technique applied in the present disclosure, is an unsupervised learning approach that leads to parts-based and realistic mammogram image representations. Unlike other factorization methods including but not limited to the principal component analysis (PCA), singular value decomposition (SVD) and independent component analysis (ICA), the NMF representation yields only additive, not substractive combinations of the original mammogram image components.

Alternatively to Eq. 1, the NMF factorization can be expressed as the following Eq. 2 or Eq. 3. Given an m-by-n mammogram image A, the NMF provides the following decomposition into non-negative matrices W and P:

$$A_{m \times n} \approx W_{m \times r} P_{r \times n} \quad (Eq. 2) \text{ or}$$

$$A_{m \times n} = W_{m \times r} P_{r \times n} + E_{m \times n} \quad (Eq. 3)$$

where the columns of W are called the NMF base images and the rows of P are their encoding coefficients. The factorization error is given by matrix E. For accurate factorization of W and P, the rank r is chosen such that: $(m+n)r < m \times n$. Each vector representing the pixel intensity values of the image lexicographically scanned and stored in the columns of a matrix A. NMF decomposes this matrix into two matrices, W of dimension $m \times r$ and P of size $r \times n$ so that their product approximates, to some extent, the original matrix A. Hence, the compression of data is achieved and the compression ratio of NMF is provided by $m \times n/(m+n)r <$. The low-dimensional representation of the m-dimensional original vector A is thus given by the r-dimensional vector P. Each original image can be reconstructed as A=WP.

Keeping in mind that the NMF does not allow negative entries in W and V, it has found several image, speech and data applications, including but not limited face recognition and gene extraction. The NMF factorization, given by Eq. 1, defines the following optimization problem: Given a non-negative image, $A \in \mathbb{R}^{m \times n} \neq$, find non-negative approximations, $W \in \mathbb{R}^{m \times k} \neq$ and $V \in \mathbb{R}^{k \times n} \neq$ such that $k < \min(m, n)$. Then, this non-convex constrained optimization is defined as follows:

$$f(W, V) = \|A - WV\|_2^F = \sum_{ij} (A_{ij} - (WV)_{ij})^2 \quad (Eq. 4)$$

The Frobenius, norm, $\|\bullet\|_2^F$, is used to measure the approximation error. Other common objective functions include the Kullback-Leibler divergence objective function:

$$D(A\|WV) = \sum_{ij} \left( A_{ij} \log \frac{A_{ij}}{(WV)_{ij}} - A_{ij} + (WV)_{ij} \right) \quad (Eq. 5)$$

Eq. 5 can be solved using different algorithms including multiplicative updates, gradient descent and alternating least squares (D. D. Lee and H. S. Seung, "Learning the Parts of Objects by Non-Negative Matrix Factorization," Nature, Vol. 401, No. 6755, pp. 788-791, October 19; M. W. Berry, M. Browne, A. N. Langville, V. P. Pauca and R. J. Plemmons, "Algorithms and applications for approximate non-negative matrix factorization," Computational Statistics & Data Analysis, Vol. 52, No. 1, pp. 155-173, 2007; H. S. Seung and D. D. Lee, "Algorithms for non-negative matrix factorization," Advances in neural information processing systems, Vol. 13, pp. 556-562, 2001—each incorporated herein by reference in its entirety). The multiplicative updates for solving Eq. 4, are given by:

$$W_{ij} \leftarrow \frac{(AV^T)_{ij}}{(WVV^T)_{ij}} W_{ij} \quad (Eq. 6)$$

$$V_{ij} \leftarrow \frac{(W^T A)_{ij}}{(W^T W V^T)_{ij}} V_{ij}$$

In the PCA approach to image decomposition, all image pixels are considered to be sample statistics of the same underlying color formation model. By performing an eigenvector calculation on an ensemble dataset, the independent eigenvalues/eigenvectors are assumed to represent the original pure stains expressed as a linear combination of the red, green and blue components of the observed images. Deconvolution can then be performed by applying the inverse transformation. Some critics of the PCA approach point out that some transformation matrix components could be negative, which does not conform to the additive staining model assumption.

The NMF transformation thus addresses this weakness by attempting a factorization of the ensemble dataset, subjected to a non-negative factor constraint.

Figure 4:
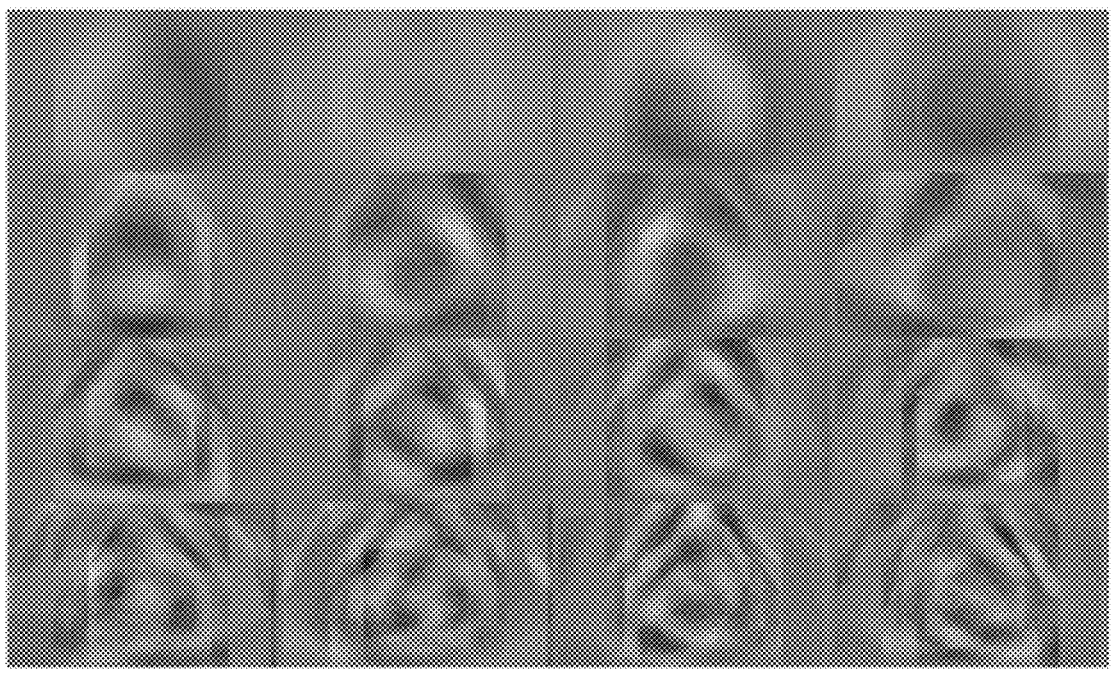
FIG. 4 is an image showing the first 16 retained bases of the principal component analysis (PCA) decomposition.
Figure 5:
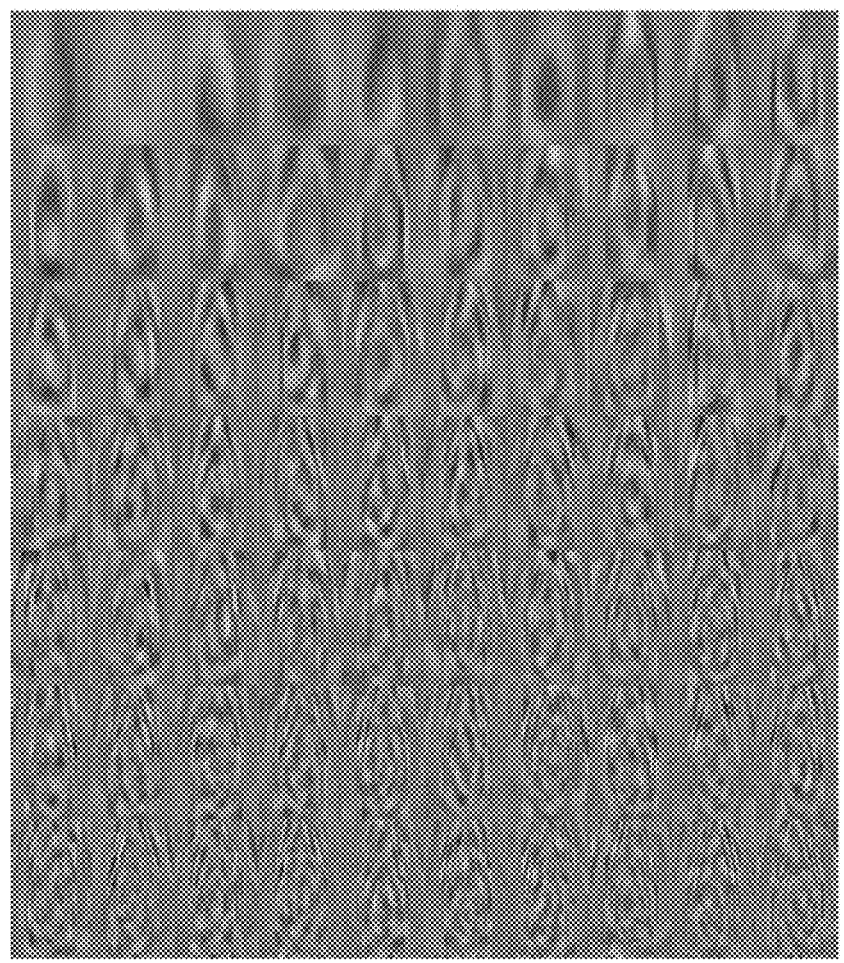
FIG. 5 is an image showing the first 80 retained bases of the principal component analysis (PCA) decomposition.

For comparison to the first 16 bases by NMF decomposition of FIG. 3, the first 16 and 80 bases extracted and retained by PCA are shown in FIGS. 4 and 5, respectively.

Given their universal classification capabilities, kernel matrix-based support vector machines (SVM) are used to classify the NMF extracted features into breast density categories (binary or multi-class) at step S250. As such, a CBIR system based on the breast density categorization is used for classification. The SVM classifier finds the linear decision boundary (or hyperplane) that successfully separates data pertaining to two or more given categories. Moreover, this hyperplane maximizes the separating distance between the two or more categories. A higher classification performance is achieved by greater separating distance. For example, maximum-margin classifiers outperform neural-based ones by attaining 5 to 10% improvement in classification accuracy (C. M. Bishop, "Pattern recognition and machine learning," Vol. 1, New York: Springer, 2006—incorporated by reference herein in its entirety).

The efficiencies of the NMF-based and the PCA-based breast density classification methods can be assessed and compared using the mammographic image analysis society (MIAS) database. This annotated, open-sourced public database contains 322 mammographic images (50 micron pixel edge) taken in medio-lateral oblique (MLO) view (W. R. Silva and D. Menotti. Classification of mammograms by the breast composition. In International Conference on Image Processing, Computer Vision, and Pattern Recognition (ICPV 2012), pages 1-6, July 2012—each incorporated herein by reference in its entirety). All images, reduced to 1024×1024 pixels, can be annotated by experienced radiologists and classified into three distinct density categories: 1. fatty; 2. fatty-glandular and 3. dense-glandular. In one embodiment, there are a total of 106, 104 and 112 images in the first, second and third categories, respectively. In one embodiment, training and testing experiments are conducted using 70% and 30% of the full mammogram and ROI images, respectively (J. E. E. de Oliveira, G. Camara-Chavez, A. de Araujo, and T. M. Deserno, "Content-based image retrieval applied to BI-RADS tissue classification in screening," World Journal of Radiology, vol. 3, no. 1, pp. 24-31, 2011—incorporated herein by reference in its entirety). Breast densities are also classified according to the BIRADS lexicon. This lexicon describes the breast density, along with the lesion feature and classification. Table 1 summarizes the classification results of the experiments conducted in the present disclosure. The second and third columns of Table 1 show, respectively, the mean accuracy obtained from the testing phase using 30% of the data. Simulation results reported for the PCA-based features are reproduced from Silva et al. (W. R. Silva and D. Menotti. Classification of mammograms by the breast composition. In International Conference on Image Processing, Computer Vision, and Pattern Recognition (ICPV 2012), pages 1-6, July 2012—each incorporated herein by reference in its entirety).

TABLE 1

Mean accuracy of PCA- and NMF-based density classification schemes using full mammogram and ROI images.

| Features | Full Mammogram | Patches (ROIs) |
|---|---|---|
| PCA (first 5 components) | 50.62 | 55.62 |
| PCA (first 10 components) | 50.31 | 57.81 |
| NMF (first 5 factors) | 72.43 | 77.84 |
| NMF (first 10 factors) | 75.34 | 83.19 |

As shown in Table 1, NMF yielded higher classification accuracy compared to PCA to its parts-based factorization. Additionally, the use of ROIs allowed higher classification accuracy than using full mammograms. In fact, the use of ROIs with NMF yielded the best classification accuracy since the extracted local features are not biased towards the background regions which are usually dominant in mammographic images. Furthermore, increasing the number of retained factors does not always yield higher accuracies, which is analogous with the over-fitting problem often encountered in artificial neural networks.

The NMF-based breast density classification scheme of the present disclosure does not only achieve higher classification accuracy but can properly handle the invariance in mammogram images due to the breast density as well. The NMF-based breast density classification is based on local (or parts)-based features which yield sparse structures when the sparsity constraint is imposed on the NMF factors.

Figure 6:
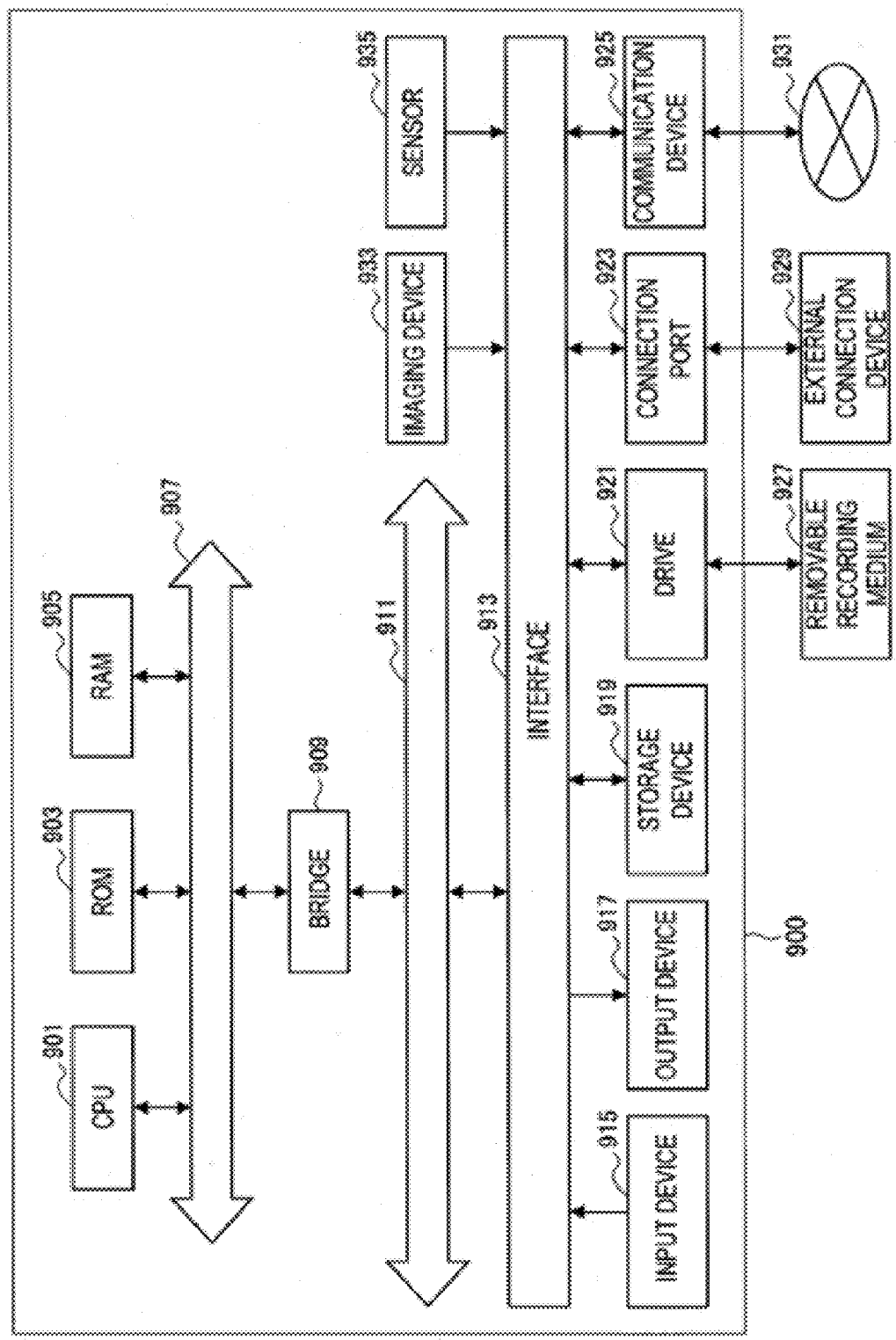
FIG. 6 is a schematic diagram of an exemplary computing system capable of implementing the CBIR NMF-based method for classifying breast density described herein.

FIG. 6 is a block diagram illustrating a hardware configuration example of a computer system an information processing apparatus according to an embodiment of the present disclosure. An information processing apparatus 900 illustrated in the drawing can realize, for example, the element, the manager, the server, the UI device, an end user terminal and/or the server device in the above-described embodiments. Through the information processing apparatus 900, the automated NMF-based CBIR method 200 for classification of digital breast mammographic images based on breast tissue density can be at least partially computer-implemented.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuitry such as a DSP (Digital Signal Processor) or ASIC (Application Specific Integrated Circuit), alternatively or in addition to the CPU 901.

The CPU 901 serves as an operation processor or a processing circuitry and a controller, and controls all or some operations in the information processing apparatus 900 in accordance with various programs recorded in the ROM 903, the RAM 905, the storage device 919 or a removable recording medium 927. The ROM 903 stores programs and operation parameters which are used, read and executed by the CPU 901. Such programs include but are not limited to computer program packages and computer program products stored on non-transitory computer-readable storage medium having computer-readable instructions and are capable of implementing the automated NMF-based CBIR method 200 for classification of digital breast mammographic images based on breast tissue density. This includes at least, the pre-processing of one or more raw digital mammogram images to remove noise and to enhance contrast; segmenting pectoral muscle apart from the pre-processed digital mammogram image(s) to form region of interest (ROI) images; decomposing of the pre-processed full digital mammogram image(s) or the segmented ROI image(s) by NMF factorization; extracting and partially selecting/retaining the NMF factors; and classifying the extracted and retained NMF factors according to binary or multi breast density categories with kernel matrix-based support vector machine classifiers. The RAM 905 temporarily stores programs which are used in the execution of the CPU 901 and parameters which are appropriately modified in the execution, for example, pre-processed digital mammogram images and segmented ROI images. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is one or more devices which are operated by a user, such as a mouse, a keyboard, a touch panel, buttons, switches, a lever and combinations thereof. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

In some embodiments, the input device 915 further includes a digital mammography machine with an X-ray detector (not shown in FIG. 6). Examples of the X-ray detector include but are not limited to image plates, flat panel detectors, direct semiconductor X-ray detectors, scintillators, scintillator plus semiconductor detectors. The digital mammography machine may include gas detectors or silicon PN solar cells for X-ray dose measurement purposes.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the information processing apparatus 900, such as calculated enthalpies of reduction and oxidation and melting points of one or more metal elements and oxides thereof, in a form of a video such as text or an image, and an audio such as voice or sound.

The storage device 919 is a device for data storage which is configured as an example of a storage unit of the information processing apparatus 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 writes in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (registered trademark) (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, such as digital mammogram images and may also be a device that takes moving images. Electrical signals converted from X-ray during digital mammography can be read on the imaging device 933, permitting manipulation of images to allow radiologists to more clearly view the results, before or after the images have been classified according to breast density using the method 200.

The sensor 935 is any of various sensors such as an acceleration sensor, a gyro sensor, a geomagnetic sensor, an optical sensor, or a sound sensor, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer-implemented method for classifying breast density from mammographic imagery, the method comprising:
   pre-processing one or more digital mammogram images of a patient with a processing circuitry to remove noise and enhance contrast;
   segmenting pectoral muscle from the one or more pre-processed digital mammogram images to produce one or more extracted region of interest images and saving the one or more extracted region of interest images in a computer memory;
   grouping the one or more extracted region of interest images to produce one large mammogram image;
   decomposing a m-by-n mammogram image matrix A associated with the large mammogram image with the processing circuitry by non-negative matrix factorization to extract and retain a plurality of non-negative matrix factors; and
   classifying the plurality of non-negative matrix factors with a kernel matrix-based support vector machine according to breast density to two or more breast density categories;
   wherein the non-negative matrix factorization is according to one of the following equations:

$$A_{m \times n} \approx W_{m \times r} P_{r \times n} \quad \text{(Eq. 2); or}$$

$$A_{m \times n} = W_{m \times r} P_{r \times n} + E_{m \times n} \quad \text{(Eq. 3);}$$

where columns of W are NMF base images, rows of P are encoding coefficients of the NMF base images, E is factorization error, r is rank and such that $(m+n)r < m \times n$.

2. The method of claim 1, further comprising imposing a non-negative sparsity constraint and reconstruction quality measures on the plurality of non-negative matrix factors to enhance overall accuracy of breast density classification.

3. The method of claim 1, wherein the decomposing retains 5 to 10 non-negative matrix factors.

4. The method of claim 1, wherein the decomposing retains 11 to 20 non-negative matrix factors.

5. The method of claim 1, wherein the classifying is binomial or multinomial.

6. The method of claim 1, wherein the classifying is in accordance with the BI-RADS mammography classification system.

7. The method of claim 1, having a mean accuracy of at least 77 percent.

8. A non-transitory computer-readable storage medium having computer-readable instructions thereon which, when executed by a computer, causes the computer to perform a computer-implemented method for classifying breast density from mammographic imagery, the method comprising:
   pre-processing one or more digital mammogram images of a patient with a processing circuitry to remove noise and enhance contrast;
   segmenting pectoral muscle from the one or more pre-processed digital mammogram images to produce one or more extracted region of interest images and saving the one or more extracted region of interest images in a computer memory;
   grouping the one or more extracted region of interest images to produce one large mammogram image;
   decomposing a m-by-n mammogram image matrix A associated with the large mammogram image with the processing circuitry by non-negative matrix factorization to extract and retain a plurality of non-negative matrix factors; and
   classifying the plurality of non-negative matrix factors with a kernel matrix-based support vector machine according to breast density to two or more breast density classes;
   wherein the non-negative matrix factorization is according to one of the following equations:

$$A_{m \times n} \approx W_{m \times r} P_{r \times n} \quad \text{(Eq. 2); or}$$

$$A_{m \times n} = W_{m \times r} P_{r \times n} + E_{m \times n} \quad \text{(Eq. 3);}$$

where columns of W are NMF base images, rows of P are encoding coefficients of the NMF base images, E is factorization error, r is rank and such that $(m+n)r < m \times n$.

9. The computer-readable storage medium of claim 8, wherein the method further comprises:
   imposing a non-negative sparsity constraint and reconstruction quality measures on the plurality of non-negative matrix factors to enhance overall accuracy of breast density classification.

10. The computer-readable storage medium of claim 8, wherein the decomposing retains 5 to 10 non-negative matrix factors.

11. The computer-readable storage medium of claim 8, wherein the decomposing retains 11 to 20 non-negative matrix factors.

12. The computer-readable storage medium of claim 8, wherein the classifying is binomial or multinomial.

13. The computer-readable storage medium of claim 8, wherein the classifying is in accordance with the BI-RADS mammography classification system.

14. The computer-readable storage medium of claim 8, wherein the method has a mean accuracy of at least 77 percent.

* * * * *